United States Patent
Peterson et al.

(10) Patent No.: US 8,952,961 B2
(45) Date of Patent: Feb. 10, 2015

(54) SYSTEMS AND METHODS FOR PHOTON MAP QUERYING

(75) Inventors: Luke Tilman Peterson, Oakland, CA (US); James Alexander McCombe, San Francisco, CA (US)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 393 days.

(21) Appl. No.: 12/825,728

(22) Filed: Jun. 29, 2010

(65) Prior Publication Data

US 2010/0332523 A1 Dec. 30, 2010

Related U.S. Application Data

(60) Provisional application No. 61/221,550, filed on Jun. 29, 2009.

(51) Int. Cl.
*G06F 17/00* (2006.01)
*G06F 17/30* (2006.01)

(52) U.S. Cl.
CPC .... G06F 17/30533 (2013.01); G06F 17/30592 (2013.01)
USPC .......... 345/426; 345/653; 345/655; 707/769; 707/778

(58) Field of Classification Search
USPC .......... 345/426, 653–656; 707/713, 775, 777, 707/803, 999.006, 999.101, 999.102, 707, 707/769, 778
See application file for complete search history.

(56) References Cited

U.S. PATENT DOCUMENTS

| | | | |
|---|---|---|---|
| 4,625,289 A | 11/1986 | Rockwood | |
| 5,933,146 A | 8/1999 | Wrigley | |
| 5,973,699 A | 10/1999 | Kent | |
| 6,344,837 B1 | 2/2002 | Gelsey | |
| 6,731,304 B2 | 5/2004 | Sowizral et al. | |
| 7,030,879 B1 | 4/2006 | Pharr | |
| 7,483,024 B2 | 1/2009 | Maillot | |
| 7,830,379 B2 | 11/2010 | Peterson et al. | |
| 8,065,288 B1 * | 11/2011 | Garland et al. | 707/706 |
| 8,115,763 B2 * | 2/2012 | Woop et al. | 345/426 |

(Continued)

FOREIGN PATENT DOCUMENTS

WO    WO 2008/037599 A1    4/2008

OTHER PUBLICATIONS

Susumu Horiguchi, Masayuki Katahira and Takeo Nakada, "Parallel processing of incremental ray tracing on a shared-memory multiprocessor," 1993, The Visual Computer, vol. 9, No. 7, pp. 371-380, Springer-Verlag.

(Continued)

*Primary Examiner* — Marc Filipczyk
(74) *Attorney, Agent, or Firm* — Michael S. Garrabrants (57) ABSTRACT

In one aspect, photon queries are answered using systems and methods of traversal of collections of photon queries through an acceleration structure, to identify photons meeting a specification of a given query. Such systems and methods can be extended to satisfying similarity queries in an n-dimensional parameter space. Queries can be associated with code (or pointers to code) that are run to achieve closure of that query. Queries can cause further queries to be emitted. Arbitrary data can be passed from one query to another; for example, parameters defined internally to the code modules themselves (e.g., the parameters do not need to have a definition or meaning to the systems or within the methods).

28 Claims, 7 Drawing Sheets

(56) References Cited

U.S. PATENT DOCUMENTS

| | | | |
|---|---|---|---|
| 8,188,996 B2* | 5/2012 | Dammertz et al. ............ | 345/426 |
| 8,189,002 B1* | 5/2012 | Westerhoff et al. ............ | 345/426 |
| 2004/0249809 A1 | 12/2004 | Ramani et al. | |

OTHER PUBLICATIONS

Bent Dalgaard Larsen, "Real-time Global Illumination by Simulating Photon Mapping," Phd Thesis, Technical University of Denmark, Kongens Lyngby, Denmark, 2004 (Available online at http://www2.imm.dtu.dk/pubdb/views/edoc_download.php/4115/pdf/imm4115.pdf, last visited Aug. 4, 2010).

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989 Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

* cited by examiner

SYSTEMS AND METHODS FOR PHOTON MAP QUERYING

CROSS-REFERENCE TO RELATED APPLICATIONS

This application claims priority from U.S. Provisional Patent App. No. 61/221,550, filed Jun. 29, 2009, and entitled "SYSTEMS AND METHODS FOR PHOTON MAP QUERYING", and which is incorporated by reference herein for all purposes.

BACKGROUND

1. Field

Generally, the following relates to systems and methods for accepting and fulfilling queries made of a dataset defined on n-dimensions, and some particular aspects relate to photon map query fulfillment, an API for accepting such queries, and n-dimensional query fulfillment and API techniques that may find more usage beyond graphics rendering.

2. Related Art

Rendering photo-realistic 2-D images from 3-D scene descriptions with various techniques is well-known in the computer graphics arts. Ray tracing is an example of an approach to visibility determinations, that in conjunction with lighting models allows creation of interesting visual effects, and highly accurate lighting effects resulting from modeling the physical behavior of the materials and surfaces involved. By contrast, rasterization techniques require more artist involvement in determining how objects in the scene affect each others' appearance, when viewed from a given perspective and under certain lighting conditions.

A lighting modeling technique of interest is called "photon mapping". An example of photon mapping is tracing light energy from a light source (e.g., a light), and determining what surfaces it hits. Then, light energy is associated with hit points. Photons from the lights can be reflected, refracted, and energy from those photons can be split among those events. Ultimately, a given photon loses energy and that photon no longer is propagated.

The photons that were deposited by this process then are maintained in one or more photon maps that can be accessed during lighting calculations that can be run, for example, after identifying an intersection point of a ray in a scene. A variety of further refinements and differences to this basic approach have been proposed, such as using different photon maps for caustic photons, and the like.

Similar to ray tracing, using photon mapping for lighting determinations is quite compute intensive, and at its most realistic and most unimplementable could involve attempting to trace each photon coming from a given light source, which for an example 60w green light bulb would require a computer about $10^{14}$ times faster than those available at the time (2004). Thus, practical usage of photon mapping has required approximations. The following, in some aspects, proposes techniques for providing results from photon maps and mechanisms for interfacing with systems implementing such techniques.

BRIEF DESCRIPTION OF THE DRAWINGS

The following figures are referenced in the specification, in order to further explain examples and aspects of the disclosure.

DETAILED DESCRIPTION

The following primarily relates using photon mapping for lighting effects in 3-D scene rendering, as well as to more generalized servicing of queries made of an n-dimensional dataset. In some cases, aspects can be used in conjunction with ray tracing as a mechanism to render 2-D representations of 3-D scenes. In some cases, elements of a system architecture can be shared for use in both ray tracing and photon mapping. For example, in some aspects, a common form of acceleration structure can be provided for both ray tracing and photon map queries, and hardware portions of a system tuned for accelerating ray tracing also can be used in accelerating the photon map queries (and n-dimensional data set queries, as provided for in some examples).

One aspect of this disclosure relates to provision of an API that is intended for use with systems implementing photon mapping for determining lighting during rendering of 3-D scenes. In further aspects, this disclosure relates to provisional of a capability for serving queries about data points in a generalized n-dimensional space, apart from a specific application in scene rendering.

As such, although the principal examples used herein are in 3-dimensional space, these disclosures are application in a space of any dimension (n-dimensional space). In discussing such application to higher-order dimensions, it can be helpful to generalize the terminology. Two principal kinds of data operated on in these disclosures are the data points themselves, which in one application, are photons deposited in a scene. Such photons can be used during diffuse lighting operations or calculations. For an n-dimensional space, these data points typically would be defined by a real number provided for each of the dimensions. In some applications, these numbers can be represented as floating point numbers.

In some applications, queries that ask what points are nearby a given point can be answered. To efficiently answer these queries, an acceleration structure is provided that comprises a plurality of elements, where each element can be considered a surface defined in the n-dimensional space. The elements of the acceleration structure can be defined to bound different selections of the data points, and are associated with each other such that a search of the acceleration structure can be made. In some examples, the acceleration structure can be a hierarchy, where each element has one or more child elements, and its child elements each bound some subset of the data points bounded by its parent. In some common examples, the acceleration structure elements can be considered manifolds of n−1 dimension, for an n-dimensional space. For example, a ball's surface is a 2-D manifold, and can be used to bound datapoints that are defined in 3 dimensions.

Figure 1:
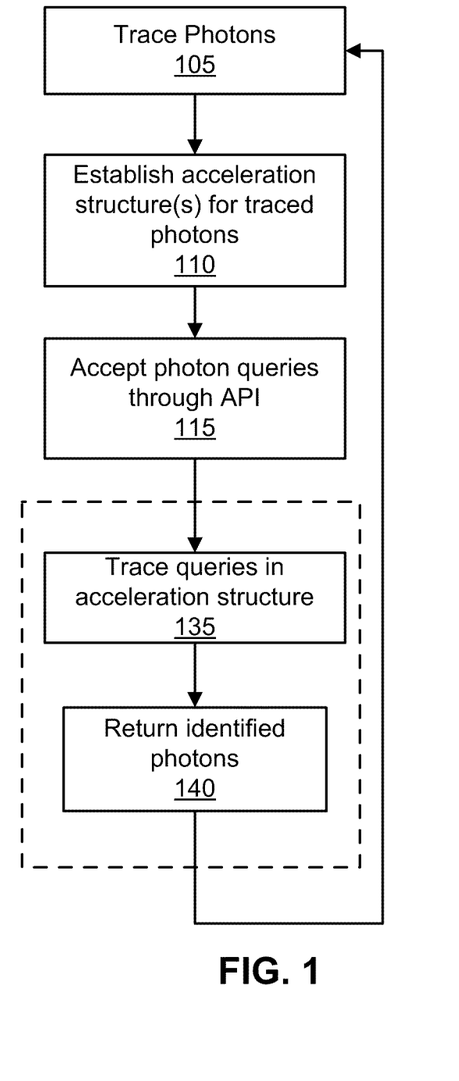
FIG. 1 depicts an overview method of establishing photon locations in a scene, and then querying to identify selections of the photons meeting criteria, where the queries can be submitted through an API.

FIG. 1 depicts an overview of a method for establishing a dataset for photon queries and using same. Method 100 comprises tracing photons in the scene 105 to establish a photon map. An acceleration structure is provided 110 that bounds selections of the photons with respectively elements of the structure. The structure can be hierarchical, and more generally comprises a graph with nodes connected by edges, where the nodes represent elements of the structure.

Photon queries can be accepted through an application programming interface 115. Those queries can be traced 135 in collections. The collections can be formed based on determining overlap between an extent of elements of the acceleration structure and the extent defined by the photon query (or queries). Photons meeting each of the queries can be returned (140).

Regarding the acceleration structure, for example, the acceleration structure may be comprised of spheres located in the scene (again, relying on the 3-D example), and the photon queries each can establish a locus (e.g. an origin) and a distance from that point in which photons are to be identified (for spherical queries). Spherical queries are an example, and other query definitions and approaches can be implemented. In some aspects herein, it can be helpful to visualize queries in terms of their shapes, and other queries shapes that can be implemented include partial hyperspheres, hyper-ellipsoids, hyper-boxes, beams, and cones. More generally, such shapes can be viewed as defining a hypervolume. One approach to query definition allows definition of a manifold of an n dimensional data space, where the definition of the manifold serves as the definition of the query to be served. Other examples of query definitions can include discontinguous hyperspaces or surfaces. Queries also can be defined using Boolean operators on multiple simpler queries. Here also, the term manifold is helpful for understanding the concept, as Euclidean spaces generally are more easily understood. However, datasets and queries according to a variety of aspects herein are not strictly limited to or confined by principles of Euclidean geometry.

Queries also can be defined with fuzzy boundaries, as well as boundaries that are data dependent. Examples of such queries include a query to find closest k photons to a locus, and k closest photons that meet a criteria.

Each element of the acceleration structure is related to one or more other elements of the acceleration structure. Potentially, elements of the acceleration structure serve as parent nodes for a number of children elements. When a parent node is ready for test, its children are fetched and tested against all the photon queries that previously were determined to overlap an extent of the parent node of the acceleration structure (the extent of overlap partial, in that parts of the acceleration structure and of the photon queries may not overlap, also). As such, a search can continually narrow and focus further on more granular collections of photons, until finally a small enough batch of photons can be returned for each query. Elements of an acceleration structure each can abstract a substructure (a sub-graph) of a number of nodes, and traversal of the sub-graph with a query or collection of queries can depend on whether the node of the acceleration structure abstracting that sub-graph has been intersected.

Figure 2:
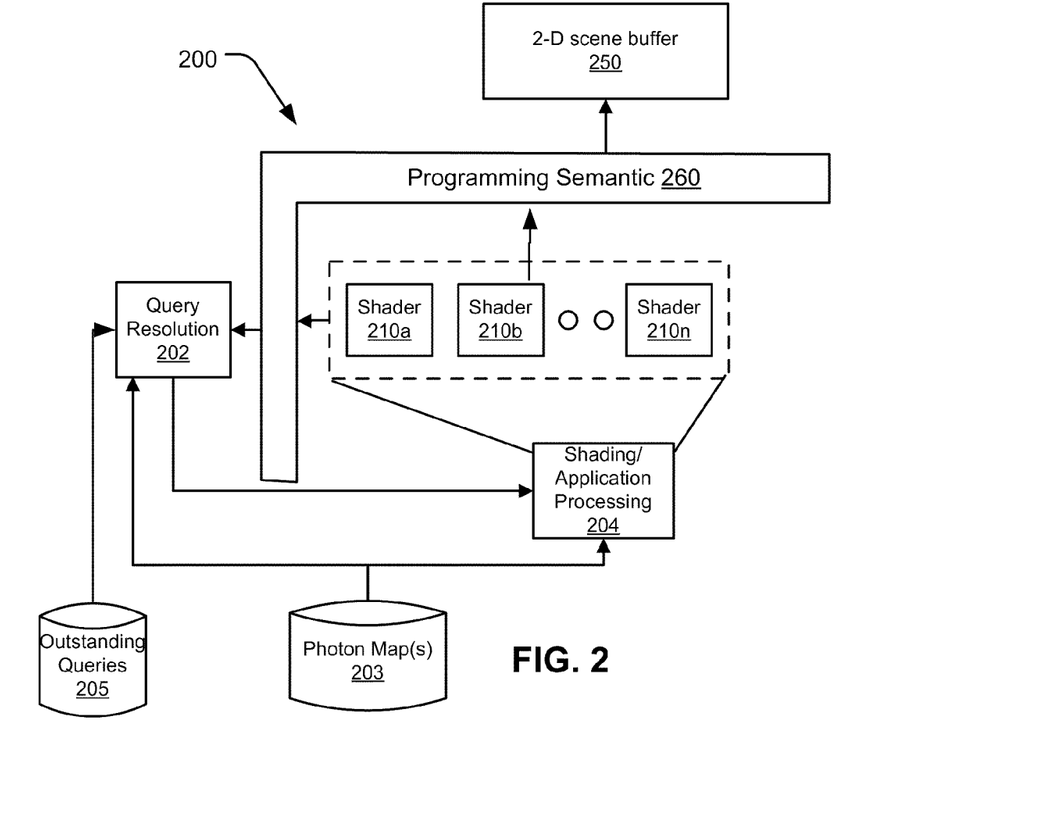
FIG. 2 depicts an overview of a system where a programming semantic that can be adopted by an API allows querying of photon maps, query storage, and execution of code identified by resolution of photon queries.

FIG. 2 depicts a diagram of how a programming semantic 260 can abstract elements that produce photon queries from the resources that will satisfy those queries. In some examples, shaders 210a-210n produce the queries, while query resolution 202 can also serve as a ray intersection tester as well. Query resolution 202 can include intersection testing componentry, such as test cells programmed to execute an algorithm to determine whether a given point is within a given space, or whether given defined spaces overlap, for example. Query resolution 202 also can include programming or circuitry (or both) for traversing an acceleration structure with a number of elements that bound different selections of data points in a scene (such as photons). An example of photons and an acceleration structure organized into a graph are presented in FIGS. 7 and 8, respectively.

Figure 7:
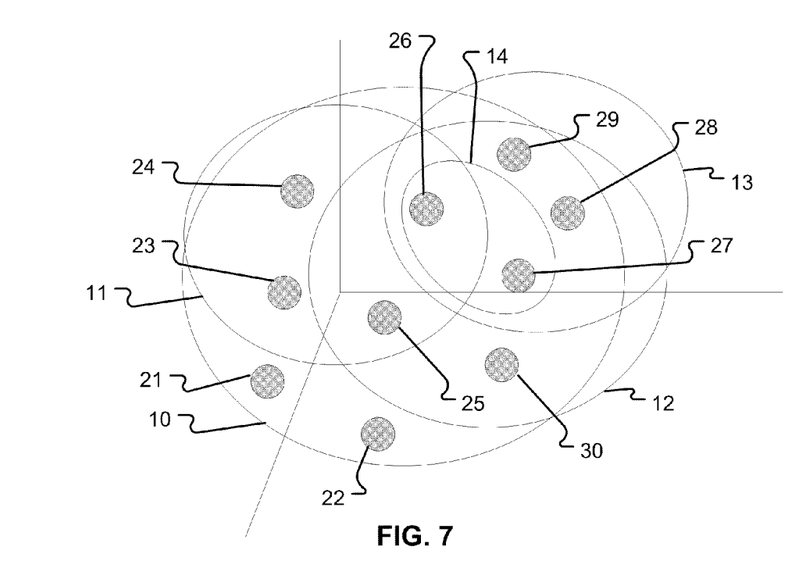
FIG. 7 depicts an example of photon (more generally, data element) location in a multidimensional relational structure, such as an orthogonal coordinate system, and elements of an acceleration structure that can bound selections of the photons.

FIG. 7 depicts that data points 21-30 (photons in one application) are located in a multi-dimensional system according to values of the parameters of the system. For example, in the photon example of a 3-D scene, the photons can be located with respective coordinate tuples. Elements 10-14 of an acceleration structure bound selections of the depicted data points. In some approaches, the acceleration structure elements can be manifolds of the parameter space in which the data points are located; for example, in a 3-D space in which photons are located, the acceleration structure elements can be 2-D manifolds, such as spheres. The respective selection of data points bounded by each element of the acceleration structure and an example relationship between the depicted elements can explained with respect to FIG. 8.

Figure 8:
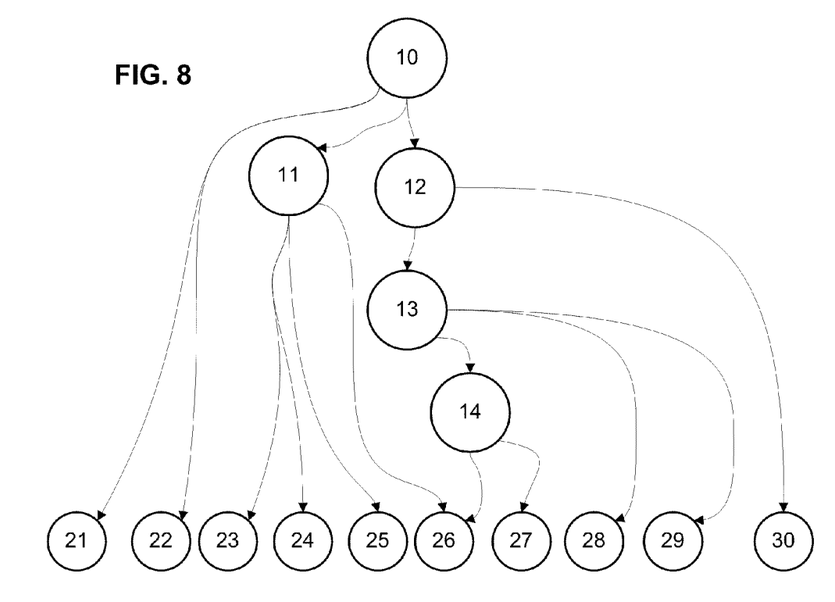
FIG. 8 depicts an example graph of the nodes of the acceleration structure of FIG. 7.

FIG. 8 depicts that one approach to providing relationships among the depicted acceleration elements 10-14 is that a hierarchy can be provided, in which element 10 bounds all the data points, while elements 11 and 12 bound a subset thereof. Elements 13 and 14 bound respectively finer selections of data points bounded by element 12. Acceleration structures can be hierarchical, homogenous, or heterogeneous. The depicted acceleration structure of FIG. 8 is heterogenous, in that different acceleration structure elements directly bound (i.e., without an intervening acceleration element) one or more data points, as well as data points bounded by one or more intervening acceleration elements.

Figure 3:
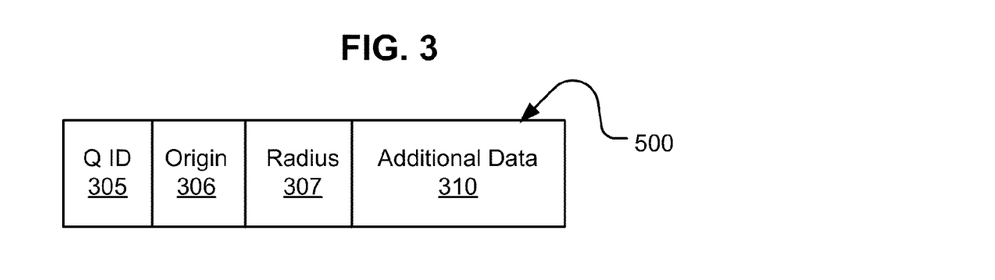
FIG. 3 depicts an example data structure that can be used to define, or which can be made to embody one or more photon queries.

FIG. 3 depicts an example data structure 500 for defining a query (e.g. a photon query), which can include an identifier 505 for the query, and query definition data, which in this example for a sperhical query includes an origin (more generally, a locus comprising one or more points), and a radius 507. Data structure 500 also can be associated with or store additional data, which can include code to be executed, a pointer to code to be executed, or data to be passed to a shader (or more generally, code) associated with a data element (e.g., a photon) found to satisfy the query. In turn, that code can specify an additional query, and additional data 510 can be provided in a data structure for that query. Queries can be defined by reference to another query, such as sharing an origin, a radius, or additional data, for example.

In some cases, each photon query can have a unique identifier, or at least unique among the photon queries then outstanding, although the identifier may repeat. In some cases, hardware resources can be provided for query resolution, and hardware identifiers can be maintained for use in identifying queries being actively tested in hardware resources, as well as software identifiers that have a wider range and which can be used to identify queries that are stored in memory, but not currently being tested in hardware resources. Translation between the two can be provided, or a mapping maintained.

Figure 4:
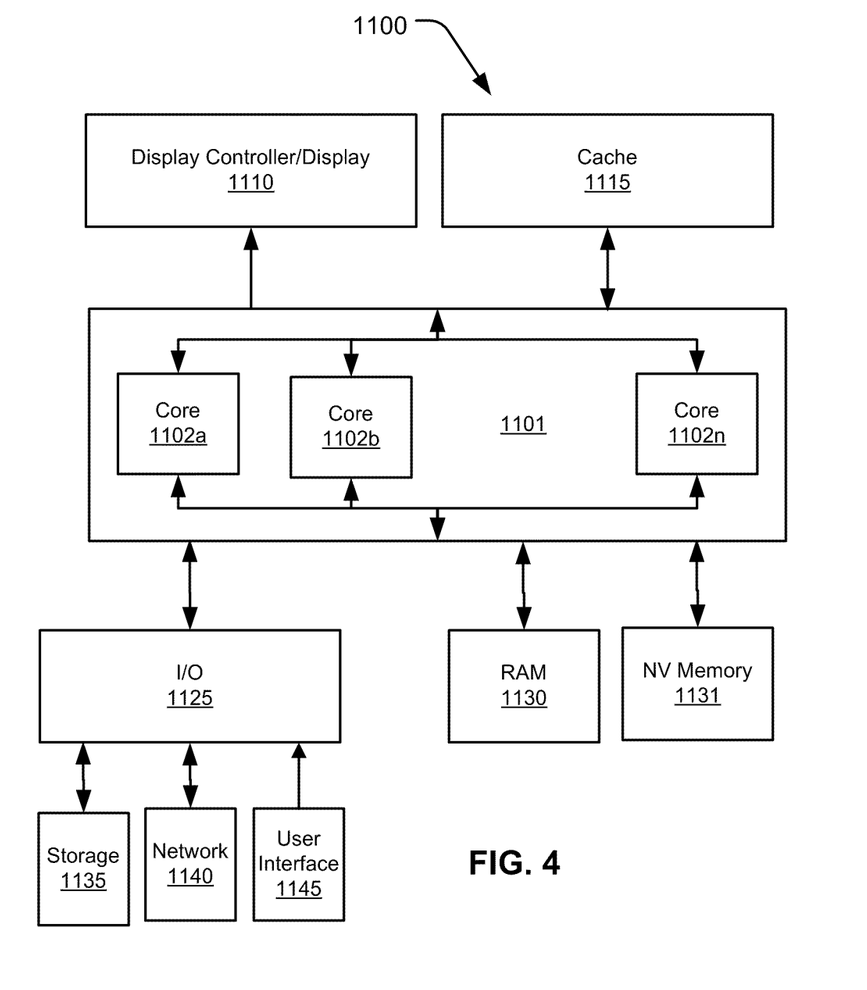
FIG. 4 depicts an overview of an example system in which disclosed methods can be practiced

FIG. 4 depicts an example computer architecture that comprises a processing resource with a plurality of cores, an I/O subsystem, a RAM, a display controller and a cache. Such hardware can be configured for use in satisfying photon queries, as well as run applications that can generate such queries. Hardware acceleration can be provided in add-on cards attached through I/O, or as built-in circuitry. In some examples, a preferred allocation of hardware resources is to maintain structure that can hash identifiers for acceleration elements returned during intermediate query traversal through the structure to determine whether a collection for a given element exists, and then add a given query ID to that structure. In some implementations, data defining queries can be distributed for local storage among a plurality of test regions, and the query identifiers can be passed among the test cells, which activates testing thereby.

Figure 5:
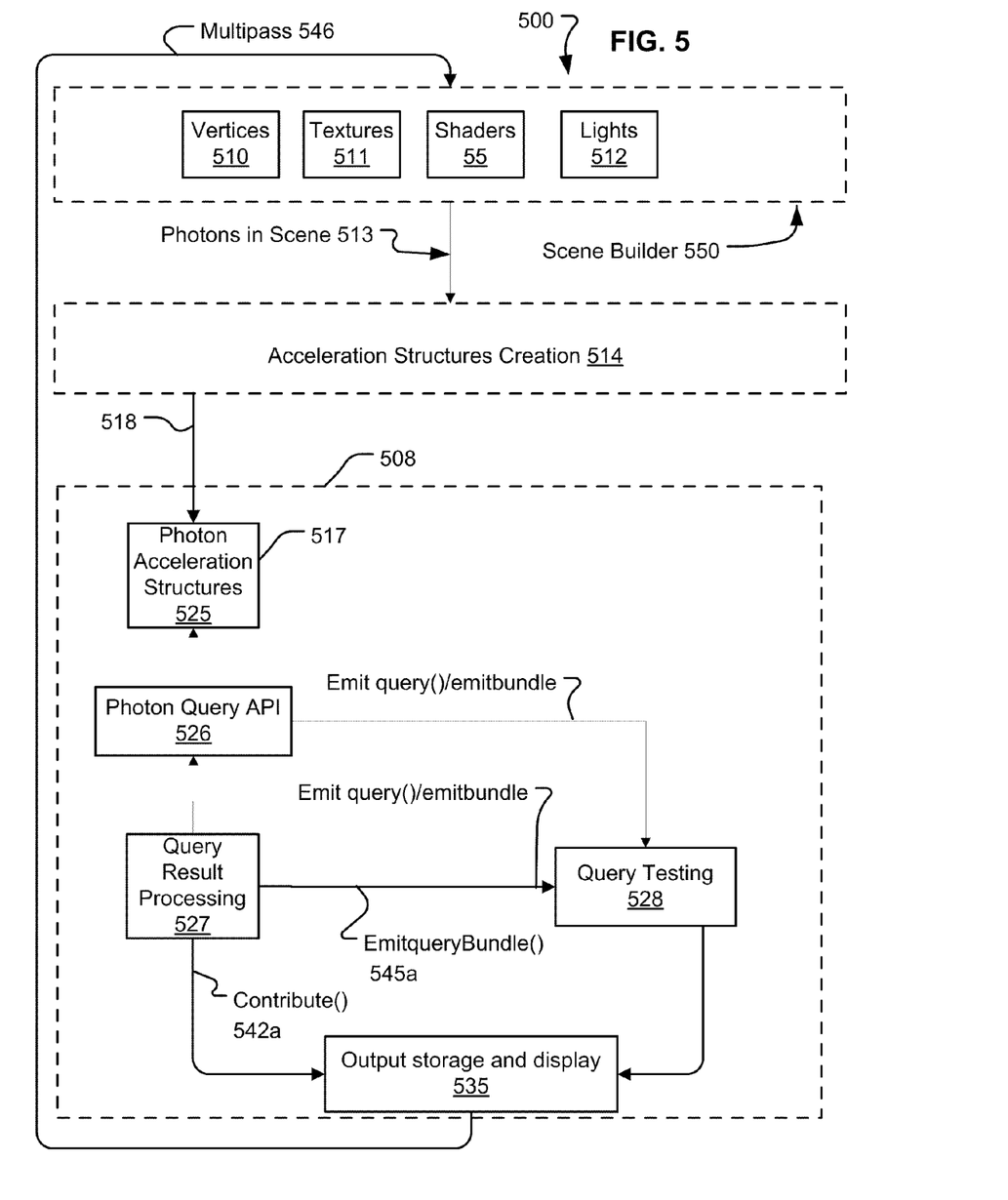
FIG. 5 depicts a flow of how example systems can behave when implementing disclosed aspects.

FIG. 5 depicts a diagram of how various components of a system can prepare a scene data structure to allow photon querying and then operate to emit specific queries under operation of a given control structure (e.g., a program or group of programs, such as a collection of shaders), satisfy those queries, responsively emit further queries and ultimately output a result or results. In particular, a scene builder 550 can input vertices 501, textures 511, shaders 55 and lights 512 (all by way of example), and photons can be mapped into the scene (513) based on these inputs. For example, interaction between light emitted by lights 512 and surfaces defined by vertices 510 and textures 511 can influence where photons ultimately are deposited (located) in the scene). An acceleration structure creation procedure 514 can be run, which will generate acceleration structure elements (see FIGS. 7 and 8) that bound selections of the photons and relate to other acceleration structure elements. These photon acceleration elements (structures) can be outputted (518) and used by a run time system that traverses queries through the acceleration structure (such as on a collection-by-collection basis, as described here). These photon acceleration structures can be stored in a memory resource 525, which can in some example implementations also store information defining the wire frame of the scene (e.g., tessellations from vertices 510, as well as texture data 511 and so on). Photon query API 526 operates to allow emission of queries or bundles of queries, such as by a camera shader. Query testing 528 operates to traverse the queries through the acceleration structure and ultimately return identifiers for one or more photons (or more generally, data elements) meeting the criteria specified by the query (or by the queries of the bundle). Query result processing 527 executes code (such as shader code) identified based on which photons were returned (in some examples), and in other examples, such code can be executing during a process of ray tracing—such as to determine diffuse lighting available at an intersection point determined during ray tracing of a scene—where the code executing was associated with the object that was intersected by the ray). Query result processing also can cause further query emission (such as emit query bundle 545a. Query result processing 527 also can cause contribution of results to an output buffer (output storage 535), which can comprise multiple separate components, and queries can identify one or more locations in the buffer to which their results are to be contributed, in some implementations. A multipass feature can be provided where outputs can influence the scene itself.

Figure 6:
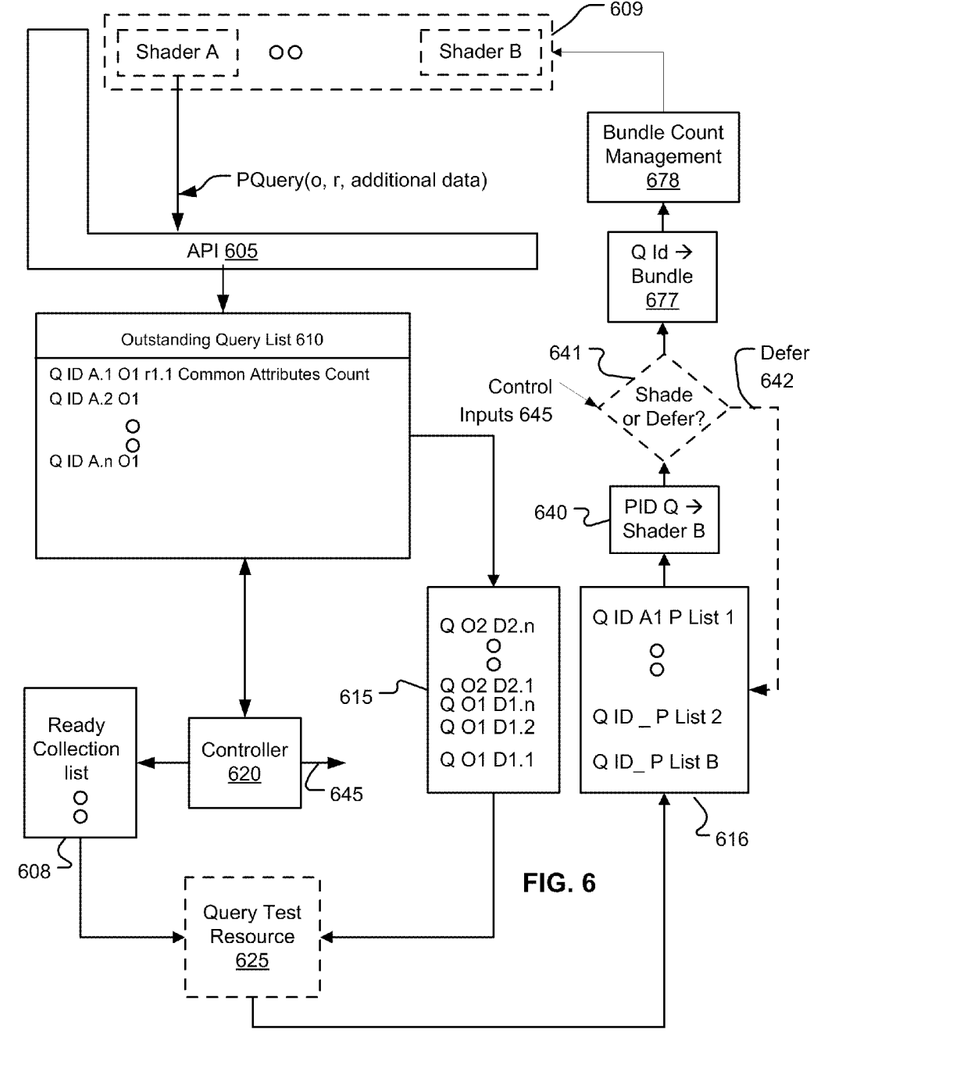
FIG. 6 depicts photon query submission and servicing in a system, in which a population of queries awaiting resolution can be controlled by selectively closing state for some of the queries and maintaining control of query execution collections, in accordance with disclosed aspects.

FIG. 6 depicts aspects of an system organization for query resolution. An API 605 can be provided to receive definitions of queries from query sources, such as code modules (shaders 609). The queries received through API 605 can be stored in an outstanding query list 610. Controller 620 can cause queries from outstanding query list 610 to begin a query resolution process (such as traversal through an acceleration structure). The availability of such a connection is depicted by a queue 615 of queries awaiting service by a query test resource 625. In some examples, groups of queries from query list 610 are inputted at a given time, to start at a root node of an acceleration structure. The queries are organized on a collection by collection basis, and stored in a memory accessible to controller 620. In some examples, controller 620 has access to a high speed memory, such as a cache with a number of slots that can be assigned to particular elements of the acceleration structure, and queries can be identified as being associated with the elements by entering an identifier for each query in a slot for the element to which the query is to be associated.

Controller 620 can maintain a ready collection list 608 which includes collections of queries that have been determined ready for test. For example, a collection of queries is ready for test when there is at least a determined number of queries associated with a given element of the acceleration structure. When the query test resource 625 can test the queries of a collection against a set of acceleration elements identified based on their relationship with the element associated with the collection selected for test, query test resource can cause definition data for those queries to be fetched from a comparatively slow memory and tested against the queries of the collection. Query test resource 625 can comprise a plurality of test cells, which each can operate synchronously or asynchronously, or within a window of available testing, with the other test cells. O where population control for photon queries can be implemented. Population control can occur by determining whether there is spatial locality for photon queries, and preferentially holding back some queries. For example, queries entering the hierarchical structure may split many more ways, while queries farther down in the structure may split less (given that a query can exist in a number of collections simultaneously). Therefore, preference can be given to queries closer to completion. FIG. 6 also illustrates attribute sharing for photon queries such as in outstanding query list 610. Outputs from query test resource 625 can comprise a list of queries identifiers associated with one or more identifiers for photons (or more generally, data elements) determined to satisfy the query (616). The outputs can be grouped according to query or according to photon, or both. A matter between a given photon and a section of code (such as a shader) can be provided (640), which can provide an input to a decision whether the output should be shaded (other inputs 645 can come from controller 620). If the decision is to defer 642, then the photon can be returned to list 616. If the decision is to shade, then a query identifier can be used to map to a bundle of queries 677, such as to identify parameters for the query or for the photons. A count management process 676 can be conducted, which can manage a number of queries in flight, and operate to provide a feedback to either dampen or increase secondary production of queries according to system through and resource availability.

FIG. 7 depicts an example where photons are located in a 3-D scene, and elements of an acceleration structure are provided that bound selections of the photons. The set/subset relationship between photons bounded by each of the edges can represent which elements of the acceleration structure would be related to each other (e.g., which nodes of a graph of the acceleration structure elements would be connected by an edge).

FIG. 8 depicts an example where the above description can be extended to n-dimensions. In n-dimensions, a number of 3-D acceleration structures can be provided that can be independently searched for intermediate results sets 1-3. Subsequently, each of those results sets can be intersected to obtain a final result set. In a different example, one n-dimensional acceleration structure can be provided, such that a plurality of intermediate result sets may not be obtained, and instead only a final result set would be obtained. A benefit to using an intermediate result set can include that hardware may be designed for 3-D operations, such that implementation of method aspects disclosed herein may be adapted for use on such hardware.

As disclosed above, each of the queries can be collected against elements of the acceleration structure and further traversal of each query can be deferred in favor of further traversal of other query collections. In some examples, collections can be selected for further processing based on a number of queries collected. In other cases, considerations such as query population control can be considered. In some exemplary implementations, datasets used will be updated comparatively infrequently (e.g., on the order of 10 milliseconds, such as may be appropriate in a system operating to produce final outputs 60 times a second, or on the order of 5 milliseconds, for final output frequency of 120 times a second, for example). Generally also, it is contemplated that a large number of queries will be required, where each is relatively insensitive to latency or time of completion. A maximum latency for resolving a single query can be specified, such that the query resolution resources can be allocated to satisfying queries that have aged a given amount. In situations where closure of a query can cause additional queries to be spawned, control of a population of defined queries that require resolution can be controlled by selecting different types of queries to be resolved.

In some exemplary aspects, systems are organized to be used as query engines by distributing data defining the queries among local storage associated with testers (e.g., among caches associated with cores). The query definition data can remain there until the query completes. Testing can be activated by passing identifiers for the queries among the testers. The identifiers passed can be determined by control circuitry that maintains collections of query identifiers against elements of the acceleration structure. When an acceleration structure element is selected for test, a DMA can be provided to fetch the children elements of that element, and those elements can be provided to the test cells. The results can be collected at the test cells, or returned responsive to completion of testing in those test cells. Queues can be provided that allow out of order testing at the test cells. Multiple test cells can share a queue. Multiple test cells can share a cache. Packets can be passed among the test cells to collect results as well as to pass query identifiers.

Thus, in these examples, a query can specify a locus in n-dimensions, and the acceleration structure can be provided as an arrangement of manifolds in n−1 dimensions, such that for the 3-D example, the manifolds would be 2-D surfaces bounding selections of points (as described above). As such, the query engine can return points that are deemed similar to each other based on the critieria presented in the query.

A further call that can be provided in an API according to this disclosure is a call allowing emission of a bundle of photon queries all sharing at least one characteristic or similarity. For convenience, such a call can be named "EmitphotonBundle" and can accept data defining or from which can be derived an origin and extent for each photon query, data defining attributes shared among the queries of the bundle, data defining attributes unique to each query, as well as shared or unique parameters for each query.

The additional data can be user-defined and can be application-specific. For example, an attenuation vector or number can be implemented as such additional data (e.g., an origin and a radius are central to defining a spherical query, but data that may be used for implementing different photon constructs can be made to vary herein among different applications).

As was disclosed above, an API call can be provided to allow a shader to directly contribute to a buffer (e.g., buffer 450). Such contribution, although prototypically additive, can also implement different functions in such contribution, including setting. Also, a buffer to which a contribute call may write can be an intermediate buffer used for any purpose, and not only a buffer storing color information directly relevant to a pixel color. Thus an accumulation buffer or to otherwise accumulate, encompasses capturing effects of write operations from usage of the contribute call available in the API.

FIG. 4 illustrates an example system that can be used to implement system 400 and/or components thereof. System 1100 comprises a computing resource comprising a plurality of cores 1102a-1102n, with each core being used to identify a plurality of logically and/or physically separate sub-units of computing resource 1101, which each can be used to execute operations that can be hard-coded and/or configured using code from computer readable media. For example, each core 1102a-1102n may be operable to concurrently execute multiple computing threads. Computing resource 101 is operable to communicate with a cache 1115, which represents one or more fast access memory components, and which can be assigned to respective core(s) from cores 1102a-1102n, shared, or some combination of assignment and sharing. An I/O interface 1125 provides access to non-volatile storage 1135, examples of which include one or more hard disk drives, a flash drive, DVD, or high-definition storage media. Interface 1125 also provides one or more network interfaces 1140, which can comprise, for example, Ethernet and 802.11 wireless networking capability, Bluetooth, and so on. Interface 1125 also provides access to a user interface 1145, which can comprise a mouse, keyboard, microphone, touch screen input, and so on. System 1100 also comprises a RAM 1130, which communicates with computing resource 101, and can be used for storing code and data used more frequently than code and data stored in storage 1135. System 1110 also can comprise a non-volatile memory device or devices for storing code and data according to this disclosure. System 1110 also comprises one or more of a display controller and display, collectively identified as 1110. In some cases, one or more of cores 1102a-1102n can be physically located on a graphics card having other display controller logic, and conversely, display control logic can be co-located with computing resource 1101.

In some cases, it may be preferable to store queries currently being tested for intersection in cache 1115, while fetching primitives, acceleration elements, or a combination thereof for testing from RAM 1130 when required. Shaders can be stored in RAM 1130, along with texture data. Each core 1102a-1102n may be assigned to perform intersection testing or shading, or in some cases, may perform a combination of intersection and shading operations.

Programming semantic 260 (FIG. 2) can be stored in storage 1135 or non-volatile memory 1131, and loaded into RAM 1130 (or a combination of RAM 1130 and cache 1115) with a rendering application, such as a video game, a computer aided design or animation package, and so on. Programming semantic 260 also accesses code and/or hardware appropriate to the particular system implementation, to implement the query emission and light contribution calls described above.

FIG. 5 illustrates a programming-centric view of a flow 500 in which aspects described above can be embodied. Flow 500 includes a data upload phase in which an application can upload vertices 510, textures 511, and shaders 512 for rendering a scene to a renderer. A portion of the renderer can process this data to create primitives, such as triangle strips, for example, that were formed based on vertices 510. Primitives 515a-515n also can be linked to one or more textures from textures 511 and one or more shaders 512. Shaders 512 can be for a variety of different purposes. For example, some shaders can be for handling visible light effects while others can be for handling physics, geometry deformation, and so on. Thus, shaders for a given primitive can be linked to run consecutively, or only under certain conditions.

In any case, textures 518 (can also be called texels) and shader code 517 can be provided to a frame shader 525. Frame shader 525 can be run for each pixel of a 2-D representation to be rendered from a given 3-D scene. Frame shader 525 can use inputs including textures 518 and shader code 517, which a programmer can use to supply data (generally through textures 518) and code (through code 517) that can be executed for use in performing such tasks as determining what queries to issue for a given pixel or more broadly, an element of data set to be completed. Analogously, filtering operations can be performed on these pixels or data elements. Thus, frame shader 525 can use both emit and contribute calls, respectively identified as Emit Query( ) 541a and Contribute( ) 542a. Because flow 500 is programmer centric, intersection testing occurring between Emit Query( ) 541a and query shader 530 is abstracted (i.e., intersection testing determines what photons (or more generally, data elements) meet a given query, and hence what shader will be run). In sum, a function of a camera in traditional ray tracing can be provided using a more generalized concept of a fully featured frame shader 525 for general data querying or photon query systems, giving increased flexibility to a programmer as to how queries should be issued into a scene for testing, while also providing a useful abstraction of the rendering implementation.

Another aspect of flow 500 is that a vertex shader 520 can run to perform functions generally attributed to vertex shader as presently described in the literature. Ray shader 530 also receives texture information 531 and shader code 532, and similar to frame shader 525 use that information in determining how to use an Emit Query( ) 541b call and a Contribute( ) 542b call (i.e., calling the same respective functions as calls 541a and 542a). Generally, shader 530 represents an instance of shader code executed in response to an identified ray/primitive intersection, on associated texture data, and other data, as available, such other data including additional data passed through a ray data structure, provided by a potential prior shader, such as Frame Shader 525.

Still further aspects in accordance with these disclosures can include analysis of shader code written for use with a recursive ray tracing methodology/renderer, and automatically converting that recursive shader code into shader code for non-recursive ray tracing. This automatic conversion can be useful in converting shader code written for use in recursive code implementations for non-recursive implementation.

In sum, any of the functions, features, and other logic described herein can be implemented with a variety of computing resources. A computing resource can be a thread, a core, a processor, a fixed function processing element, and the like. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

Thus, scene builder 550 accepts shaders that may be called to run during intersection testing of a scene being rendered. The shaders can pass data to each other through the EmitQuery ( ) call, which can accept elements of additional data as arguments, or a query data structure with such elements.

FIG. 6 depicts system functionality where queries can be submitted through an API, can be collected, and served in a system where a query population can be controlled by controlling closure and timing of closure of queries for which data elements have been identified, and which await code execution, which may result in further queries being specified.

These query bundle calls can be provided by an API semantic 605, such that when shaders use these calls, a compiler or other software that is preparing to render a scene can appropriately interpret these calls based on that semantic. API 605, as implemented on a given system, and during shader execution (i.e., during rendering of a scene, as shaders are identified based on identified intersections, code representing these ray bundle calls will be executed). Such execution interoperates with a memory storing a master copy 610 of query data defining queries that have been emitted for intersection testing, but generally which have not yet completed intersection testing. Some of these queries generally are being actively intersection tested in an intersection testing resource 625, while others of these queries await intersection testing.

A controller 620 manages master query data copy 610 and determines which queries are to begin intersection testing, and update master copy 610 as intersection testing results become available and as shaders continue to emit new queries.

Also, in this particular example, a queue of query identifiers 608 is populated under control of controller 620. Queue 608 is read by intersection testing resource 625, when it can accept new queries for intersection testing. In an example, data defining the queries identified by query identifiers in the queue are separately provided in a queue 615 for storage in a localized memory in the intersection testing resource 625 (not illustrated here). In some cases, queue 615 need not be provided, and query definition data can be DMA'ed to one or more local memories accessed by intersection testing resource 625.

Intersection testing resource 625 outputs intersection testing results to a results queue 616, and typically includes an identifier for a primitive intersected, and the query identifier. For example, results queue 616 includes, as one entry, query ID A1, and Primitive ID Q. Controller 620 (or another functional block) can determine that primitive Q maps to Shader B (i.e., that shader B determines how primitive Q behaves). Subsequently, a decision whether Shader B is to be executed for primitive Q is made (641). That decision can be made based in part on control inputs 645. Such control inputs can include indications of current resource usage, such as current usage or occupancy of a total available memory space for query data master copy 610. The decision to shade or not (641) also can use information about shader B, which could have been derived at compilation time, or is otherwise inferred based on contents of shader B. Decision 641 also can be made based on a weight associated with the query, or another suitable indication of relative importance of the query to the scene.

If the decision to shade a given query intersection is affirmative, then there can be mapping between the query ID for that query and its associated bundle (if there is such a bundle—there need not be, as queries can be emitted singly, or even if emitted using a bundle call, then can all be stored with completely distinct and independent information). Then, a count of remaining queries of that bundle can be updated 678. The shader for the query can be executed in shader computation resources 609.

Control inputs 645 can comprise a variety of other information about system usage. For example, control inputs 645 can comprise an upper bound, above which higher weight queries are to be deferred for shading, and a lower resource bound at which higher weight queries are to be preferred for shading. Further information can include an average weight for the queries that are currently stored in query data master copy 610, trend information about such query weight, and the like.

Systems, methods and computer readable media embodying aspects of the above description related to accepting shaders and determining a query data structure for additional data elements inclusive in the query data structure can be provided. In these cases, additional data elements also can be embodied by references, such as memory references, logical or physical, rather than directly representing a given data value. The references can be used to retrieve corresponding data from one or more memories. The additional data elements can be associated with a data type when originally defined in shader source code (e.g., integer, float, double, string, and so on). These data types can be used by scene builder 1450 in determining a query data structure and for correlating elements among shaders. Scene builder 1450 can be embodied in systems and code that also provide the API aspects related to contributing color and emitting queries, as described above. For example, an API can include calls for submitting shader code, geometry, textures, and so on, in addition to calls used by shaders during runtime. After an application has submitted such information through the API, the application can indicate that the scene is ready to be rendered.

Figure 9:
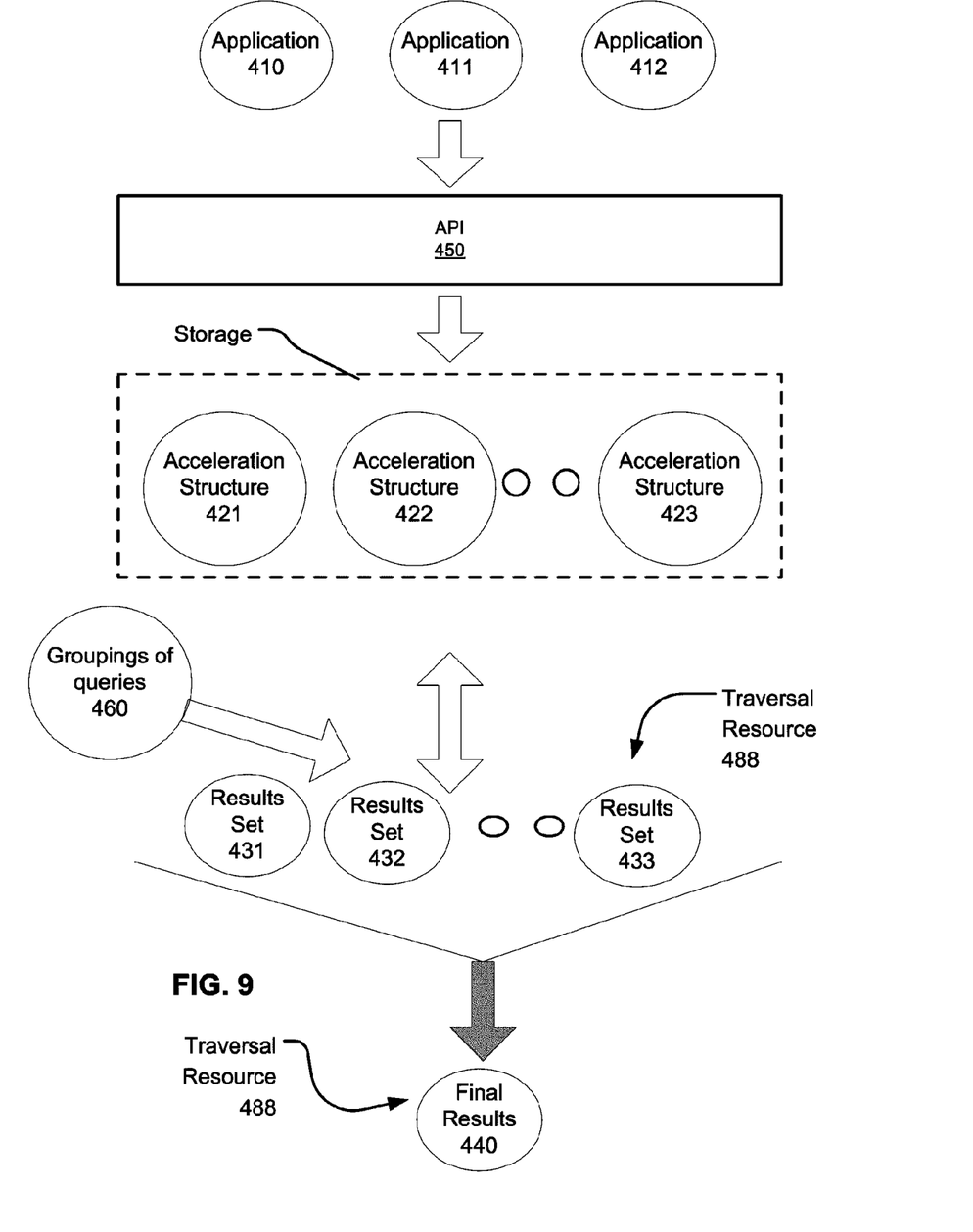
FIG. 9 depicts an implementation of servicing queries for a dataset having more than three dimensions, and where multiple applications can submit queries to be serviced using the dataset.

FIG. 9 depicts an example where a plurality of applications 410-412 can use an API 450 to input queries and data sets that will be used to construct one or more acceleration structures 421-423 (in one example, each can be an 3-D structure, and a number can be provided to allow a total of n dimensions of data). Result sets 431-433 can be produced by a traversal resource 488, responsive to groupings of queries 460 and using to acceleration structures 421-423. Ultimately, a final set or results 440 can be produced, which identifies data elements that meet criteria specified by the queries.

The above disclosures provide examples of methods and systems for resolution of queries in a given parameter space, where the parameter space is occupied by spatially located data elements, which in some implementations can be represented by points located in the parameter space. Queries can define a shape or shapes within the parameter space that define a hypersurface and allowing a determination whether the spatially located data elements are within or without the parameter space defined by a given query. Queries can be submitted singly or in bundles. Queries can be defined by reference to one or more other queries. Queries can be associated with arbitrary data, such as a pointer to code, or code that will be executed in a computation resource. Such code can in turn cause additional queries to be defined. These queries can reference or otherwise inherit such additional data. Examples of system control include controlling a number of queries that are emitted by selecting queries to be closed, such as by executing associated code. Implementations can be used in the context of ray tracing, to implement functions such as diffuse lighting calculations, and in such implementations, the API calls described can be used by shader code associated with one or more rays that have been found to intersect a surface associated with that shader code. Queries can be traced in collections, such that a given collection or set of queries is tested against a group of acceleration elements that may be bound data elements that satisfy one or more of the queries.

Implementations can use one or more general purpose processors or processor cores, each operable to execute one or more threads. Portions of the capability of each processor can be allocated to execution of traversal routines for queries, while other portions of such capability can be allocated to running code associated with queries that have been satisfied. Other implementations can use special purpose testers to implement portions of a traversal algorithm. For example, testers can be provided that are optimized to execute a particular intersection algorithm. In some implementations, relatively fast memory is allocated to storage of queries in flight where they are repeatedly tested against different portions of an acceleration structure, while slower and larger memory is allocated or used to store portions of the acceleration structure.

Examples of applications of additional data include attenuation vector(s), associating weights or masses or other physical attributes with queries, mathematical operations such as filtering or blending specifications, flags indicating or influencing shader behavior, executable code (e.g., code for procedural geometry that can modify or influence the scene or objects in the scene), and so on.

Code for any method can be stored in computer readable media, such as solid-state drives, hard drives, CD-ROMs and other optical storage means, transiently in nonvolatile memories as well as embodied in communication signals. When such code is embodied in a communication signal and that signal is read and processed by a computer, the computer uses that signal and its physical medium as a computer readable medium.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Some aspects of the API described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. Various names were provided for particular coding concepts in both recursive and non-recursive query tracing (e.g., Trace Query( ), Emit Query( ), and EmitQueryBundle( ) ).

These names imply no requirement as to what code performing these functions need to called in an implementation.

The various examples described above are provided by way of illustration only and should not be construed as limiting. For example, only a limited example of query tracing behavior was presented, and it would be understood that practical implementations involve many more queries, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other query tracing/query shading implementations, and no implied limitation as to its application exists from the systems, methods, and other disclosure used to explain examples thereof.

We claim:

1. A system for servicing photon map queries, comprising:
a memory storing an acceleration structure including nodes that respectively define surfaces that each spatially bound a respective selection of a plurality of photons spatially located in a 3-D scene, the selections of varying relative granularity, and the nodes arranged in a graph with edges connecting pairs of nodes;
a processor configured for executing an interface for accepting photon queries from one or more code modules or shaders, each of the photon queries defining a respective locus, a spatially located volume in the 3-D scene that includes the respective locus, and a maximum number (k) of photons to be returned responsive to the photon query, wherein k>=1; and
an acceleration structure traversal resource configured for processing the accepted photon queries by traversing the acceleration structure with collections of photon queries from the accepted photon queries, wherein each collection is associated with one or more nodes of the acceleration structure, the traversal performed, collection-by-collection, for the photon queries by testing each of a plurality of child nodes of the node(s) associated with a selected collection of photon queries for overlap with each of the spatially located volumes of the photon queries of that collection, and updating a status of collections maintained in a memory by referencing each photon query in a respective collection associated with each child node found to overlap with the spatially located volume of that photon query, wherein the acceleration structure traversal resource is operable to identify, as an output of traversal, for each of the photon queries, identifiers for up to k photons that are closest to the locus in the 3-D scene defined by that photon query and within the spatially located volume defined by that photon query.

2. The system of claim 1, wherein the spatially-located volume of each query is a sphere defined by an origin and a radius around the origin.

3. The system of claim 1, wherein the identifier for each of the k photons is data describing that photon.

4. The system of claim 1, further comprising a memory resource for storing query state defining queries being traversed, the system configured to overwrite query state for queries that have completed traversal, even while queries spawned as a result of such traversal-have not completed intersection testing.

5. The system of claim 1, wherein the interface comprises an emit photon call that accepts, from a first code module executing on a processor, arbitrary data to be associated with a first photon query, the arbitrary data made available for use by a second code module identified by resolving a second photon query to identify one or more photons satisfying the second photon query.

6. The system of claim 5, wherein the arbitrary data comprises a count of a number of other photon queries that reference the first photon query for attribute information.

7. The system of claim 5, wherein the spatially located volume for a particular photon query is defined in dependence on identifying a minimum number of photons to be returned in response to that query.

8. The system of claim 1, wherein each photon query comprises a pointer to code to be executed upon identifying one or more photons that are within the spatially-located shape defined for that photon query.

9. The system of claim 1, wherein each query identifies code to be executed upon identifying one or more photons that are within the spatially-located shape defined for that photon query.

10. The system of claim 1, wherein the interface is configured for accepting queries in a format that references one or more other queries for data defining at least one aspect of the spatially-located shape for that photon query.

11. The system of claim 1, wherein the interface comprises an application programming interface providing a photon query semantic configured for accepting, from code modules, data defining spatially-located shapes defining respective volumes for which photon results are to be returned.

12. The system of claim 11, wherein the application programming interface is operable to accept definition data defining a photon query as partially shared specification data, and partially distinct specification data.

13. The system of claim 1, wherein the acceleration structure traversal resource is operable to defer further photon query resolution testing of a photon query collections being traversed, while accumulating further photon queries into that deferred collections and restarting traversal of that deferred collection in response to a readiness criteria.

14. The system of claim 1, wherein the acceleration structure traversal resource is further operable to traverse collections of rays through a hierarchical data structure bounding including nodes that respectively define surfaces that each bound a respective volume in the 3-D scene enclosing spatially located geometry in a 3-D scene, the selections of varying relative granularity, and the nodes arranged in a graph with edges connecting pairs of nodes, and to return a closest intersection between each ray and an element of geometry intersected by the ray, which is closest to an origin of that ray.

15. The system of claim 1, wherein the acceleration structure traversal resource comprises circuitry for traversing an acceleration structure with collections of rays and with collections of photon queries.

16. The system of claim 1, wherein the acceleration structure traversal resource comprises a controller coupled with the memory, the controller configured to organize the memory as a cache with slots assigned to elements of the acceleration structure the controller configured to update a status of collections by adding a respective photon query reference to a slot corresponding to each element of the data structure with which that photon query was found to overlap.

17. The system of claim 1, wherein the acceleration structure traversal resource comprises a plurality of test regions, each having a respective local memory, and a controller operable to distribute definition data for the photon queries among the local memories of the plurality of test regions, to assign an identifier to each photon query, and to distribute identifies for photon queries among the test regions, in order to activate testing of each photon query by a respective test region whose local memory stores definition data for that identified photon query.

18. The system of claim 1, wherein the acceleration structure traversal resource is configured to track a population of photon queries being traversed, and to select of photon queries to be further processed based on a heuristic.

19. The system of claim 1, wherein the acceleration structure traversal resource is configured to allocate resources for traversing particular collections of photon queries in dependence on aging data associated with one or more queries in those collections.

20. The system of claim 1, further comprising a controller configured to determine whether or not to execute a module of code in dependence on a metric relating to a population of photon queries being traversed by the acceleration structure traversal resource.

21. A method for servicing photon map queries, comprising:
accepting photon queries from one or more code modules or shaders, each of the photon queries defining a spatially located volume and criteria for photons that are responsive to that photon query, at least some of the photon queries defining a locus and a number of photons (k) closest to the locus as the criteria, wherein k>=1;
associating each of the accepted queries with a collection of photon queries that is associated with a node of an acceleration structure, the acceleration structure including nodes that respectively define surfaces that each spatially bound a respective selection of photons located in a 3-D scene, the selections of varying relative granularity, and the nodes arranged in a graph with edges connecting pairs of nodes;
traversing the acceleration structure with collections of photon queries from the accepted photon queries, wherein the traversal is performed, collection-by-collection, by testing, in an acceleration structure resource comprising one or more processors, each of a plurality of child nodes of the node associated with a selected collection of photon queries for overlap with each of the spatially located volumes of the photon queries of that collection, and updating a status of collections maintained in a memory by referencing each photon query in a respective collection associated with each child node found to overlap with the spatially located volume of that photon query; and
returning, for each of the photon queries, identifiers for photons satisfying the criteria specified for that photon query.

22. The method of claim 21 for servicing photon map queries, wherein the respective spatially located volume for at least some of the photon queries comprises a cone and the method further comprises returning identifiers for photons within the cone, associated with an identifier of the photon query to which that identified photon is responsive.

23. The method of claim 21 for servicing photon map queries, further comprising accessing status information for collections of photon queries, the status information comprising an indication of a number of photon queries present in each collection, and selecting one or more of the collections to begin or to continue traversal.

24. The method of claim 21 for servicing photon map queries, further comprising producing a respective identifier for each photon query, and using the identifiers to reference the photon queries in the collections of photon queries.

25. The method of claim 21 for servicing photon map queries, further comprising producing a respective identifier for each photon query, distributing photon query definition data among a plurality of local memories of test cells in the acceleration structure traversal resource, and providing identifiers for photon queries to be tested to test cells whose local memories store definition data for that identified photon query.

26. The method of claim 21, further comprising producing a data structure for each photon query that includes definition data for that photon query and one or more of data to be passed to a shader and a pointer to code to be executed in response to resolving the query.

27. The method of claim 21, wherein the accepting photon queries comprises accepting data defining each photon query through an application programming interface, the data comprising data identifying another photon query from which one or more attributes are to be copied.

28. The method of claim 21, further maintaining a statistic on a population of photon queries awaiting resolution and selecting primitives to be shaded in dependence on the statistic.

* * * * *